United States Patent

Akagi

[11] Patent Number: 5,880,778
[45] Date of Patent: Mar. 9, 1999

[54] STILL-IMAGE TAKING CAMERA

[75] Inventor: Hiroshi Akagi, Nara, Japan

[73] Assignee: Sharp Kabushiki Kaisha, Osaka, Japan

[21] Appl. No.: 635,382

[22] Filed: Apr. 19, 1996

[30] Foreign Application Priority Data

May 17, 1995 [JP] Japan ................................. 7-118145

[51] Int. Cl.⁶ .................................................. H04N 5/225
[52] U.S. Cl. ............................................ 348/218; 382/284
[58] Field of Search ..................... 348/218, 220, 348/221, 222, 231, 232; 358/261.3, 261.4, 426, 432, 433; 382/236, 232, 173, 284, 282, 248, 250

[56] References Cited

U.S. PATENT DOCUMENTS

| | | | |
|---|---|---|---|
| 4,717,962 | 1/1988 | Moore | 358/433 |
| 5,267,333 | 11/1993 | Aono | 382/284 |
| 5,452,105 | 9/1995 | Tamagaki | 358/453 |
| 5,526,047 | 6/1996 | Sawanobori | 348/231 |
| 5,528,290 | 6/1996 | Saund | 348/218 |
| 5,568,285 | 10/1996 | Ikeda | 358/518 |
| 5,581,637 | 12/1996 | Cass | 382/284 |
| 5,638,464 | 6/1997 | Kawamura | 382/232 |
| 5,673,209 | 9/1997 | Heiney | 382/232 |

FOREIGN PATENT DOCUMENTS

| | | |
|---|---|---|
| 3-240372 | 10/1991 | Japan . |
| 5-260264 | 3/1992 | Japan . |
| 7-107379 | 4/1995 | Japan . |

*Primary Examiner*—Wendy Garber

[57] ABSTRACT

In a still-image camera for taking a plurality of still-images of divisions of an object area and synthesizing the still images to obtain a highly fine image, an improvement is made to realize reduction in memory capacity and in processing time for image synthesizing, thus assuring real-time image processing at a reduced cost. The still-image camera includes an image input portion for picking-up a plurality of still-pictures of divisions of an object area, a divided image compressing portion for generating compressed divided-area images by compressing the divided still-images input from the image input portion, and a synthesizing information extracting portion for extracting information necessary for image synthesizing from the divided-area images input from the image input portion before compression. The still image camera further includes a compressed divided-image storage for storing therein compressed divided-area images and a compressed divided-image synthesizing portion for synthesizing compressed divided-area images stored in the compressed divided-image storage to a compressed entire-area image according to the synthesizing information extracted from the divided-area images by the synthesizing information extracting portion.

12 Claims, 9 Drawing Sheets

| DATA | CODE |
|------|------|
| 1    | 1W   |
| 11   | 2W   |
| 111  | 3W   |
| 1111 | 4W   |
| .    | .    |
| .    | .    |

| DATA | CODE |
|------|------|
| 0    | 1B   |
| 00   | 2B   |
| 000  | 3B   |
| 000  | 4B   |
| .    | .    |
| .    | .    |

FIG.8

| MOTION VECTOR No | MOTION VECTOR |
|------------------|---------------|
| mv × 16 ( #1 → #6 ) | ( Xm, Ym ) = ( 3, 1 ) |
| mv × 25 ( #2 → #5 ) | ( Xm, Ym ) = ( 5, 0 ) |
| mv × 34 ( #3 → #4 ) | ( Xm, y Ym ) = ( 2, 4 ) |

| ROW | ADDRESS |
|-----|---------|
| 1   | 000080  |
| 2   | 000180  |
| .   | .       |
| .   | .       |

6

| ROW | ADDRESS |
|-----|---------|
| 1   | 014000  |
| 2   | 014100  |
| .   | .       |
| .   | .       |

STILL-IMAGE TAKING CAMERA

BACKGROUND OF THE INVENTION

1. Field of the Invention

The present invention relates to a still-image taking camera and, more particularly, to a still-image taking device which is capable of taking still-images of a plurality of areas of which a portion of an object is divided and of synthesizing a plurality of still-images into a highly fine still-image.

2. Description of the Background Art

Generally, still-image taking cameras provided with solid-state image sensors have small size and low energy consumption and are broadly used in video still cameras, digital still cameras, image scanners, facsimiles and so on.

Solid-state image sensors for domestic use conventionally use about 400 thousand pixels for area sensing and about 2000 pixels for line sensing. Recently, to meet an increasing demand for obtaining high resolution images, there have been manufactured high-resolution image sensors of several million pixels for area sensing and of 5000 to 10000 pixels for line sensing.

Such high-resolution solid-state image sensors, however, are very expensive and can not be expected to be available at a reduced cost in the near future.

Japanese Laid-Open Patent No. 3-240372 and No. 5-260264 disclose a still-image taking camera which, instead of such an expensive image sensor, uses a relatively cheap image sensor for obtaining a high resolution image in such a manner that a still-image is taken from each of divided areas of which a specified portion of an object is divided and then a plurality of the still-images of the divided areas are synthesized to form a high-resolution still-image.

In a conventional still-image taking camera, an image input portion divides a specified portion of an object into a plurality of areas and takes a still-image of each area. A solid-state image sensor is installed on an X-Y-movable table or manually held and is moved in a two-dimensional plane when taking still images of the divided areas of the object. Still-images as taken are partially overlapped with each other for assuring easy synthesizing thereafter.

Divided-area images taken by the image input portion sequentially enter into a divided-image storage.

A synthesizing information extracting portion extracts information necessary for image synthesizing from each divided-area image stored in the divided-image storage. The synthesizing information may include various kinds of information, e.g., information on motion vectors between divided images, information for correcting image-to-image brightness, magnification ratios of multi-focused images, deformation correcting information for images taken at an upward angle and so on. The synthesizing information extracted by the synthesizing information extracting portion is transferred to an image synthesizing portion.

The image synthesizing portion generates an entire area image by synthesizing divided-area images stored in the divided-image storage according to their synthesizing information.

For instance, in a process of synthesizing divided-area images on the basis of synthesizing information on image-to-image motion vectors, an area of an object is divided into some sub-areas and respective still-images are taken as partially overlapped with each other and are then stored in the divided-image storage.

Image-to-image displacement values may not be constant because of movement error of the moving table or hands. Therefore, the divided images can not be matched with each other without using motion vectors extracted by the synthesizing information extracting portion. If the divided images are synthesized by the image synthesizing portion without using image-to-image motion vectors, an obtained entire area image lacks continuity and has separated lines between the synthesized divided images therein.

On the contrary, divided images are taken from respective divided-areas of an object portion in such a way that they may be partially overlapped with each other, and then a specified block (searchable block) is set in each overlapped portion of each divided-image by the synthesizing information portion. Motion vectors can be extracted from each divided image by detecting movement of searchable blocks. This method is a so called block matching method, by which divided images are well matched with each other. Namely, an entire area image of satisfied continuity can be reproduced by synthesizing the divided images by the image synthesizing portion using the matching method.

The entire area image generated by the image synthesizing device is transferred and stored in the synthesized image storage. This image may be outputted by the synthesized image output portion directly to a printer or a display unit if necessary. It may be compressed to be recorded in a memory card or the like.

In the conventional still-image taking camera, divided images taken by the image input portion are stored in the divided image storage which therefore must have a large memory capacity and may be very expensive. Furthermore, the image synthesized by the image synthesizing portion as obtained is stored in the synthesized image storage which, therefore, must have a large memory capacity and may also be very expensive.

For example, to obtain a highly fine image of A4 size (JIS: Japanese Industrial Standards), it is needed to use a divided-image storage having a capacity of 16 Megabytes (MB) to store only divided-area images and practically having a capacity of 24 MB to store divided-area images plus overlaps for matching images.

A storage having such large memory capacity may be very expensive even if it is constructed as a DRAM type which is currently available at lowest cost. Such a storage is, therefore, unsuitable for use in home-electronic devices. The use of large capacity memory may also hinder the development of goods which are more miniaturized and consume less electric energy. Goods with a large capacity memory may thus be limited in its field of application.

To solve the above-mentioned problems, a still-image taking camera may be so modified that an image compressing unit is provided between the image input portion and the divided image storage so as to compress each divided image input by the image input portion and then store the compressed image in the divided image storage and to compress the entire area image synthesized by the image synthesizing portion and then store the compressed synthesized image in the synthesized image storage. This modification may reduce the required capacity of the divided image storage and the required capacity of the synthesized image storage.

However, each divided image, if simply compressed, may have uneven compression even in one line and, therefore, may not allow the extraction of information necessary for synthesizing it together with other compressed divided images. Consequently, the compressed divided images may not correctly be synthesized by the image synthesizing portion.

Accordingly, the compressed divided-area images stored in the divided image storage are extended into their original state allowing extraction of synthesizing information therefrom, then they are synthesized into an entire area image according to the extracted synthesizing information.

This method, however, requires that every divided-area image must be extracting entirely for extending therefrom necessary synthesizing information and an entire-area image synthesized from the extended divided-area images must be compressed again to be stored in the synthesized image storage if its memory capacity shall be reduced. These time-consuming operations much decrease the effectiveness of real-time image processing.

SUMMARY OF THE INVENTION

It is an object of the present invention to provide a still-image taking camera which is capable of generating a highly fine still-image of any desired area of an object by synthesizing a plurality of still-images taken from divisions of the objective area, which is inexpensive to manufacture and features real-time image processing, and which is realized with both reduced required memory capacity and reduced required image-synthesizing time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

FIGS. $2A_1$, $2A_2$, $2A_3$, $2B_1$, $2B_2$ and $2B_3$ are illustrative of a procedure of synthesizing divided images by using motion vector data.

PREFERRED EMBODIMENT OF THE INVENTION

Figure 1:
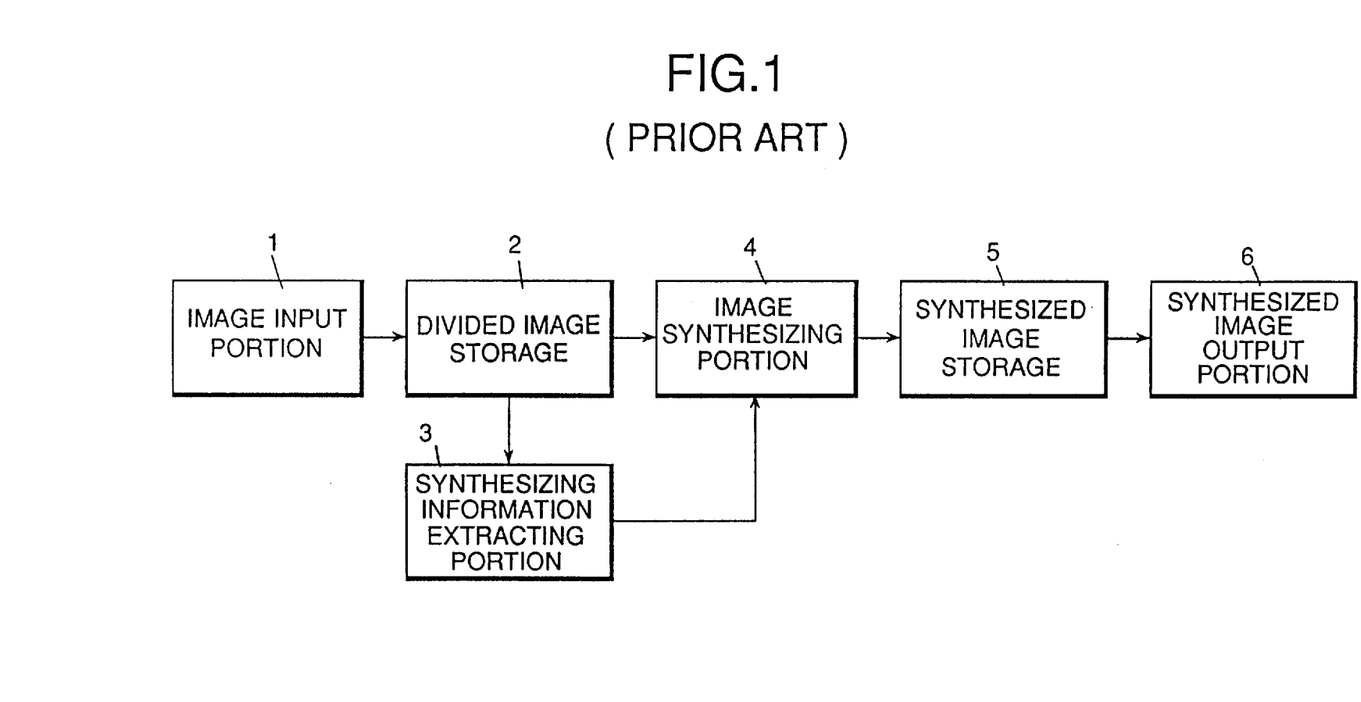
FIG. 1 is a block diagram showing a structure of a conventional still-image camera.

Referring to FIG. 1, a conventional still-image taking camera will be described in detail as follows.

An image input portion 1 divides a specified portion of an object into a plurality of areas and takes a still-image of each area. A solid-state image sensor is installed on an X-Y-movable table or manually held and is moved in a two-dimensional plane when taking still images of the divided areas of the object. Still-images are taken as being partially overlapped with each other for assuring easy synthesizing thereafter.

Divided-area images taken by the image input portion 1 sequentially enter into a divided-image storage 2.

A synthesizing information extracting portion 3 extracts information necessary for image synthesizing from each divided-area image stored in the divided-image storage 2. The synthesizing information may include various kinds of information, e.g., information on motion vectors between divided images, information for correcting image-to-image brightness, magnification ratios of multi-focused images, deformation correcting information for images taken at an upward angle and so on. The synthesizing information extracted by the synthesizing information extracting portion 3 is transferred to an image synthesizing portion 4.

The image synthesizing portion 4 generates an entire area image by synthesizing divided-area images stored in the divided-image storage 2 according to their synthesizing information.

Referring to FIG. 2, a process of synthesizing divided-area images on the basis of synthesizing information on image-to-image motion vectors by way of an example is described as follows.

Figure 2A:
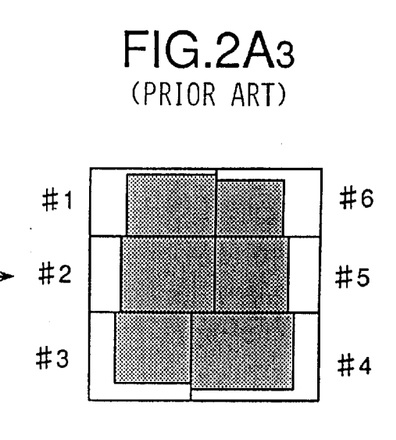
Figure 2A:
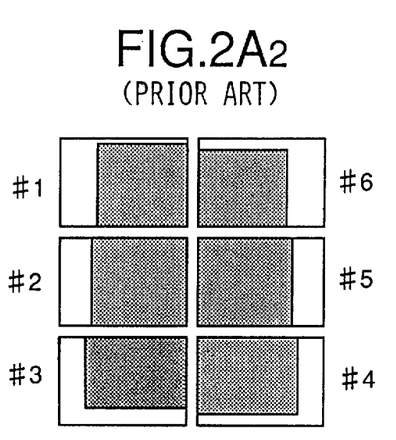
Figure 2A:
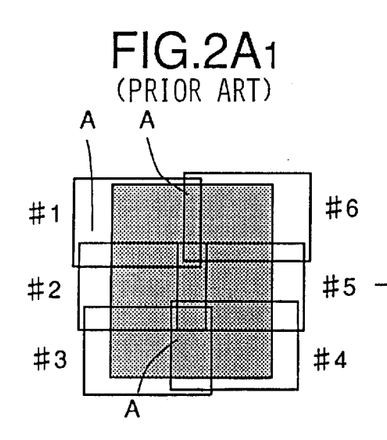

An area of an object is divided into 6 sub-areas numbered 1 to 6 and 6 respective still-images are taken as being partially overlapped with each other as shown in FIG. $2A_1$ and which are then stored in the divided-image storage 2 as shown in FIG. $2A_2$.

Image-to-image displacement values may not be constant because of movement error of the moving table or hands. Therefore, the divided images can not be matched with each other without using motion vectors extracted by the synthesizing information extracting portion 3. If the divided images are synthesized by the image synthesizing portion 4 without using image-to-image motion vectors, an obtained entire area image lacks continuity and has separated lines between the synthesized divided images therein as shown in FIG. $2A_3$.

Figure 2B:
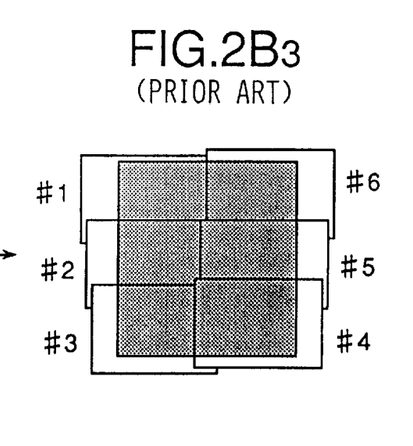
Figure 2B:
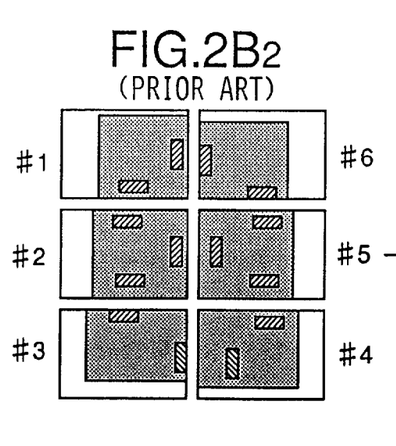
Figure 2B:
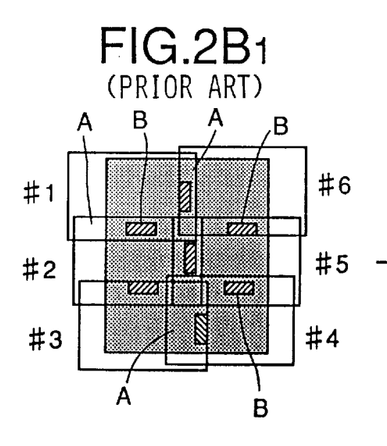

On the contrary, as shown in FIG. $2B_2$, 6 divided image are taken from respective divided-areas No. 1 to 6 of an object portion in such a way that they may be partially overlapped with each other as shown in FIG. $2B_1$, and then a specified block B (searchable block) is set in each overlapped portion A of each divided-image by the synthesizing information portion 3. Motion vectors can be extracted from each divided image by detecting movement of searchable blocks B. This method is a so called block matching method, by which divided images are well matched with each other. Namely, an entire area image of satisfied continuity as shown in FIG. $2B_3$ can be the reproduced by synthesizing divided images No. 1 to 6 by the image synthesizing portion 4 by using said matching method. The entire area image generated by the image synthesizing device is transferred and stored in the synthesized image storage 5. This image may be output by the synthesized image output portion 6 directly to a printer or a display unit if necessary. It may be compressed to be recorded in a memory card or the like.

Embodiment 1

Figure 3:
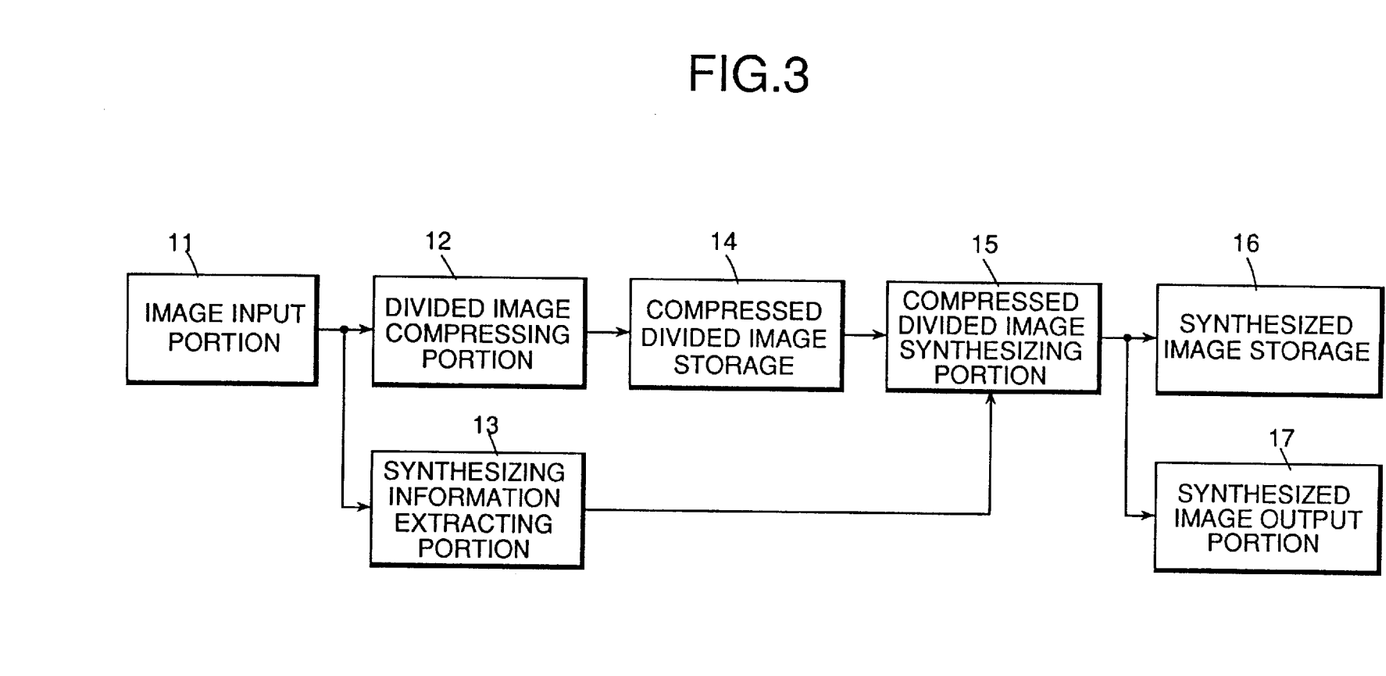
FIG. 3 is a block diagram showing a construction of a first embodiment of a still-image camera according to the present invention.

FIG. 3 is a block diagram showing a structure of a first embodiment of a still-image taking camera according to the present invention.

In FIG. 3, there is shown an image input portion 11 for taking a plurality of still-images of divisions of an area of an object, a divided-image compressing portion 12 for generating compressed divided-area images by compressing the divided-area images taken and input by the image input portion 11, and a synthesizing information extracting portion 13 for previously extracting information necessary for image synthesizing from the divided-area images taken and input by the image input portion 11 and not yet compressed by the divided-image compressing portion 12.

In the shown embodiment, the image input portion 11 is composed of a solid-state image sensor having a smaller number of pixels than an object area to be taken. This solid image sensor is usually mounted on a moving mechanism such as an X-Y table. It is of course possible to manually move the image sensor to pick up the object.

Divided-area images are compressed by the divided image compressing portion, using a compressing method which may be any one of standard coding methods (e.g., RLC: Run Length Coding, MH: Modified Huffman, MR: Modified READ, JBIG: Joint-Bi-level Image coding experts Group and JPEG: Joint Photographic Experts Group). One dimensional coding such as MH coding is particularly advantageous against other methods in view of reducing load for synthesizing the compressed images, assuring faster data processing.

In case of outputting a synthesized image by using a universal external device it is preferable to adopt a standard compressing method because the compressed data shall be finally elongated or decompressed.

The compression ratio may differ depending upon kinds of objects to be taken. In case of compressing binary-coded monochrome image, the data is compressed to $1/100$. A color image data can be compressed to $1/4$ to $1/20$ by using JPEG coding.

Synthesizing information to be extracted by the synthesizing information extracting portion 13 is, e.g., image-to-image motion-vector information for divided-area images, image-to-image brightness correcting information for divided-area images, magnification ratio for images taken with multiple focusing, deformation correcting information for images taken at an upward inclined angle and the like.

Numeral 14 designates a compressed divided-image storage for storing divided-area images obtained by the divided-image compressing portion and numeral 15 designates a compressed divided-image synthesizing portion for generating a compressed entire-area image by synthesizing the compressed divided-area images stored in the compressed divided-image storage 14 on the basis of the synthesizing information extracted by the synthesizing information extracting portion 13.

The compressed divided-image storage 14 is composed of a semiconductor memory (dynamic random access memory (DRAM) in this embodiment). In case of obtaining a highly fine image of A4 format size (about 16 million pixels) by using a DRAM, the memory cost is 30–50 thousand Japanese yen if the image is not compressed as in a conventional device, but it is reduced to 10 thousand Japanese yen with the image compressed even at a compression ratio of $1/4$. The shown embodiment may, therefore, realize a considerable saving in memory cost including an additional image compressing cost. The memory cost saving effect of image compression may be further increased in the case of generating a color image.

Figure 4:
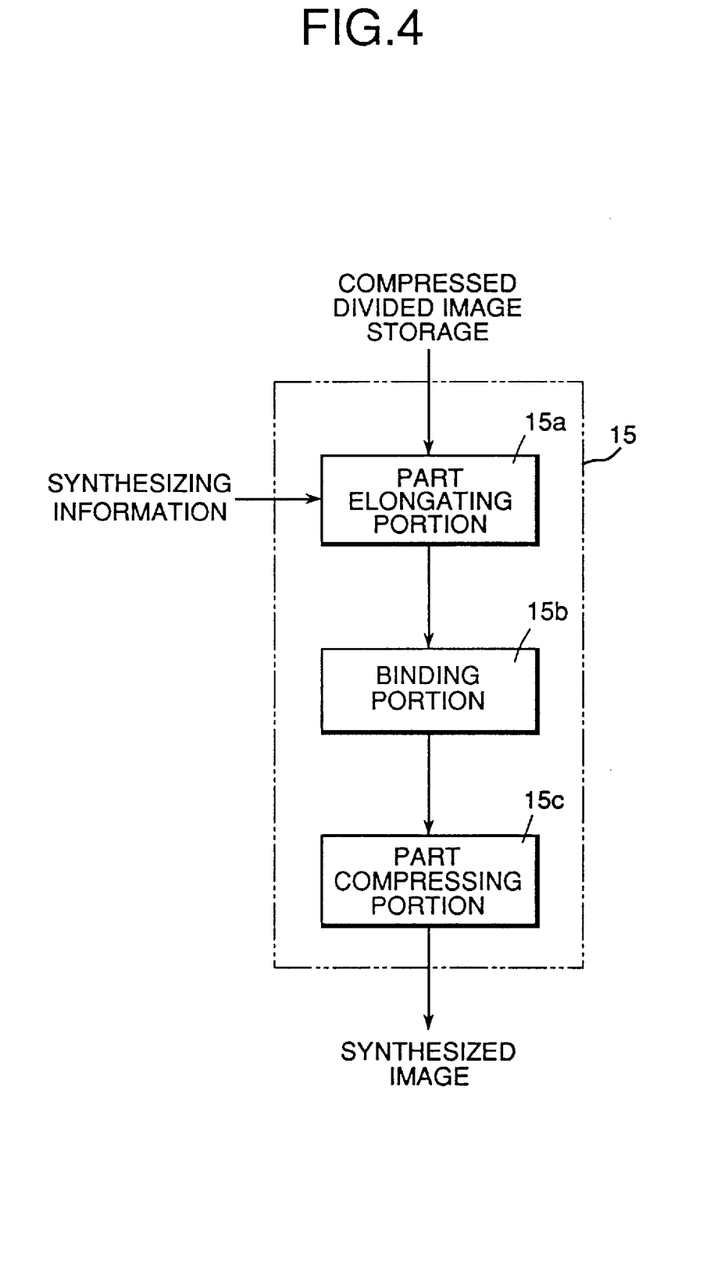
FIG. 4 is a block diagram showing a construction of a compressed partial image synthesizing portion which is included in the still-image camera of FIG. 3.

As shown in FIG. 4, the compressed divided-image synthesizing portion 15 includes a part elongating or decompressing portion 15a for elongating only a local part of each compressed divided-area image, which local part is the part necessary for synthesizing each compressed divided-area image, a binding portion 15b for binding local-part images elongated by the part elongating portion 15a and a part compressing portion 15c for compressing local-part images connected with each other by binding portion 15b. These portions 15a to 15c will be explained in detail later in the operation of the device.

Numeral 16 denotes a synthesized image storage for storing an entire-area image synthesized in a compressed state by the compressed divided-image synthesizing portion 15. Numeral 17 denotes a synthesized image output portion for outputting a compressed synthesized image to an external device.

Like the compressed divided-image storage 14, the synthesized image storage 16 is composed of a semiconductor memory (DRAM in this embodiment). The memory capacity of this storage is much reduced as compared to a conventional device since it stores the compressed synthesized image.

The synthesized image output portion 17 is designed so as to transfer the synthesized image to an external device, previously extending said image to its initial state length if the external device is a printer or a display unit, or as in a compressed state if the external device is a memory card or the like.

The operation of the still-image taking camera of the above-mentioned construction is as follows.

The image input portion 11 divides a desired area of an object into a plurality of sub-areas and takes a still-image of each sub-area with overlaps with adjacent sub-areas. In this case, for simplicity of explanation, it takes 6 still-images from 6 respective sub-areas of which an object area is divided.

Signals of each taken image are converted from analog signals into digital signals which are sequentially output as divided-image data. Consequently, the divided-areas images (i.e., sub-area images) numbered 1 to 6 are arranged with overlaps A as shown (a) in FIG. 5.

The each divided-area image data obtained by the image input portion 11 is transferred to the divided-image compressing portion 12 and the synthesizing information extracting portion 13 respectively.

The divided-image compressing portion 12 receives data of divided-area images Nos. 1 to 6 from the image input portion 11, compresses the data as shown (b) in FIG. 5 and then transfers the compressed divided-area images subsequently to the compressed divided-image storage 14 which in turn stores the received compressed image data therein. The storage 14 may therefore have a considerable reduced memory capacity as compared to a storage of the conventional device.

The synthesizing information extracting portion 13 extracts necessary synthesizing information from related data of each divided-area image received from the image input portion 11 and transfers the extracted synthesizing information to the compressed divided-image synthesizing portion 15.

Information which is necessary for synthesizing the images later may be such as image-to-image motion-vector information for divided-area images, image-to-image brightness correcting information for divided-area images, magnification ratio for images taken with multiple focusing, deformation correcting information for images taken at an upward inclined angle and the like. In this example, the motion vector information is extracted by so-called block-matching method that offers such an advantage that hardware can be easily realized.

Figure 5:
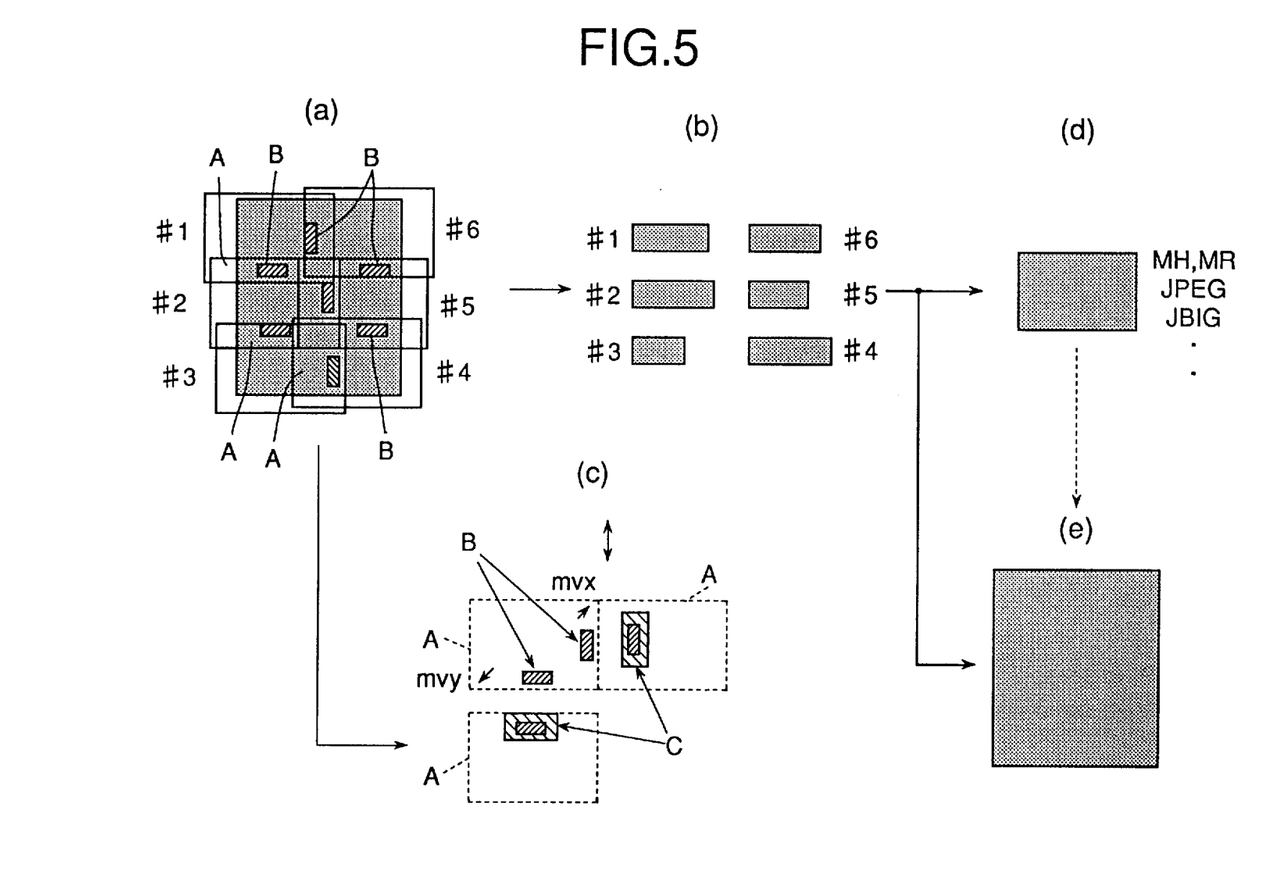
FIG. 5 is a view for explaining a concept of an image processing process in the still-image camera of FIG. 3.

Searchable blocks B are first set by one in overlapped parts A of six (6) divided-area images Nos. 1 to 6 as shown in (a) in FIG. 5. The displacement values of the divided-area images are checked by detecting motion of respective searchable blocks B.

In case of two-dimensionally synthesizing images it is needed to detect motion vectors in both horizontal and vertical directions to make synthesizable images match each other. As show in (c) in FIG. 5, a vertical motion vector "mvy" is determined between the divided-area images #1, #2 and between the divided-area images #2, #3 and a horizontal motion vector "mvx" is determined between the divided-area images #3, #4. A vertical motion vector "mvy" is determined between the divided-area images #4, #5, and between the divided-area images #5, #6. A horizontal motion vector "mvx" is determined between the divided-area images #2, #5, and between the divided-area images #1, #6. The motion vectors are finally determined so as to make all previously determined vectors match with each other.

Figure 8:
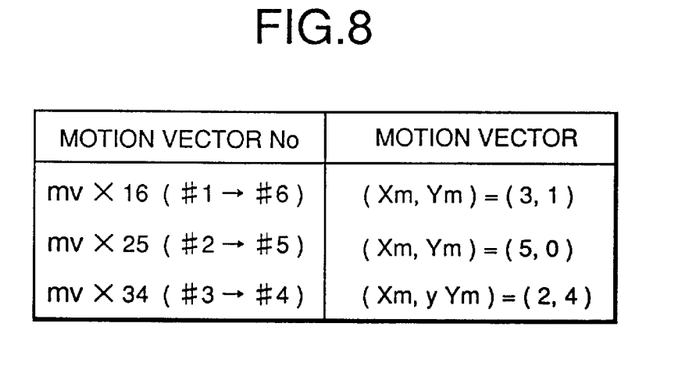
FIG. 8 is a table of data on motion vectors extracted in a synthesizing information extracting portion which is included in the still-image camera of FIG. 3.

In the synthesizing information extracting portion 13, data to be used for extracting synthesizing information is only in the searchable blocks B and in the searching areas A in overlaps A of the adjacent divided-area images. Once necessary motion vectors are detected, all other data used can be discharged. Consequently, finally usable data of motion vectors may be simplified as shown in FIG. 8 and can be stored as synthesizing information in a work memory of considerably reduced capacity.

The compressed divided-image synthesizing portion 15 generates a compressed entire-area image by successively synthesizing the compressed divided-area images stored in the compressed divided-image storage 14 according to the synthesizing information extracted by the synthesizing information extracting portion 13. The operation of this portion is as follows.

For simplicity of explanation, the divided-area images #1 and #6, which are adjacent to each other in the horizontal direction, will be synthesized together on the condition that the images are binarized and compressed by using a simple RLC (Run Length Coding) system.

Figure 6A:
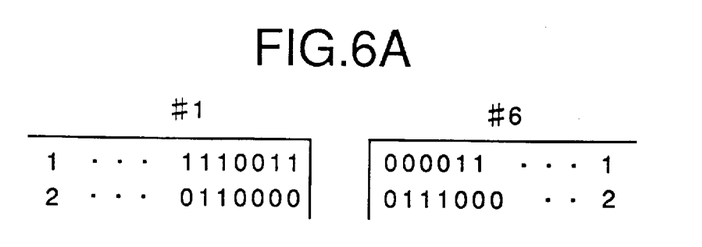
FIGS. 6A, 6B, 6C, 6D and 6E illustrate an example of synthesizing partial compressed images in a partial compressed image synthesizing unit of the still-image camera.

FIG. 6A shows horizontally adjoining portions of the divided-area images #1 and #6, whereat both images are binarized by the image input portion 11.

Figure 6B:
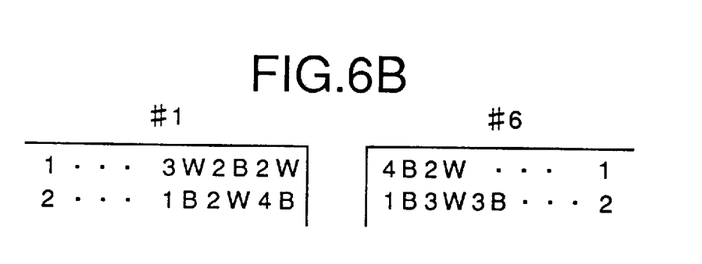

The divided-area images #1 and #6 shown in FIG. 6A are compressed by using the RLC method in the divided-image compressing portion 12. The data in boundary portions of the adjacent divided-area images, which is shown in FIG. 6A, is coded as shown in FIG. 6B. Data compressing coding method is a simple RLC method by which the data is compressed by using a coding table shown in FIG. 7. For example, a sequence of binary coded data "00" is converted into a code "2B". The data compressing coding is practically effected based upon static.

The divided-area images #1 and #6 thus generated are synthesized by the compressed divided-image synthesizing portion 15.

Referring to the synthesizing information extracted by the synthesizing information extracting portion 13 (a table of motion vectors is shown in FIG. 8), the part elongating portion 15a determines by what values both divided-area images #1 and #6 shall be displaced vertically and horizontally to bind together the images.

In FIG. 8, a motion vector No. mvx16 represents the direction of motion between the divided-area images #1 and #6, which horizontally adjoin to each other, and a motion vector (xm, Ym)=(3, 1) means that the divided-area image #6 is displaced by 3 pixels in a horizontal (X-axis) direction and by 1 pixel in a vertical (Y-axis) direction with reference to the divided-area image #1.

The divided-area images #1 and #6 may be therefore bound together by shifting the divided-area image #1 to right by 3 pixels and down by 1 pixel.

Figure 6C:
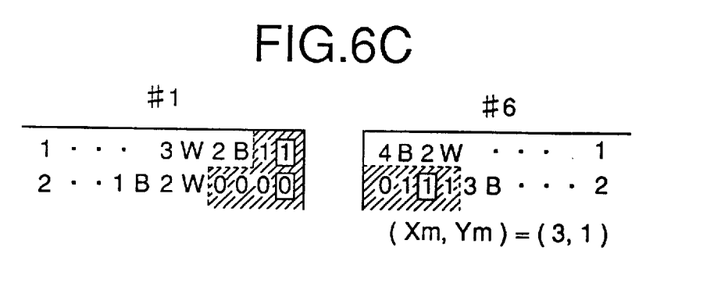
Figure 7:
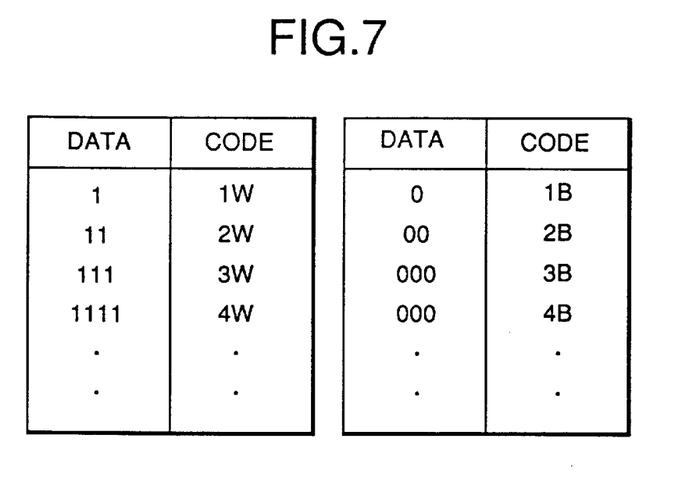
FIG. 7 is a view for explaining a coding table showing a correlation between image data and data coded by run length coding method.
Figure 9:
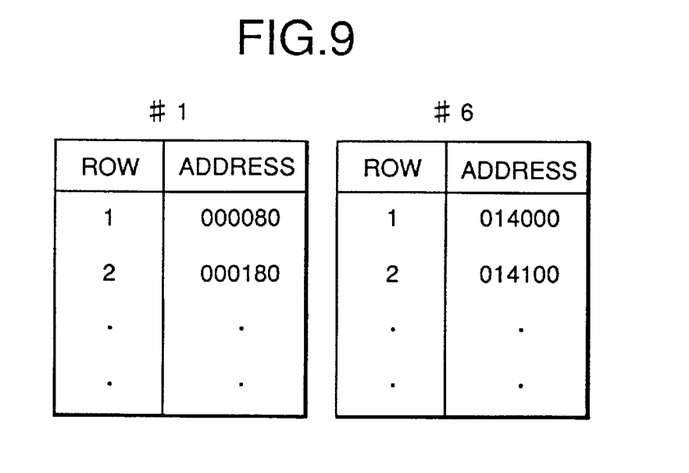
FIG. 9 is illustrative of an address table to be used in synthesizing divided images in a divided image synthesizing portion of the still-image camera of FIG. 3.

Using the coding tables of FIG. 7, the motion vector table of FIG. 8 and address tables of FIG. 9, the part elongating portion 15a elongates only necessary synthesizing parts (hatched parts shown in FIG. 6C) of both divided-area images #1 and #6. In FIG. 9, the addresses of the divided-area image #1 indicate the last position of the compressed data in respective horizontal lines (rows) while the addresses of the divided-area image #6 indicate the top position of the compressed data in respective horizontal lines (rows). For example, the first line address "000080" of the divided-area image #1 corresponds to the last code "2W" in the first line.

The address tables of FIG. 9 are previously prepared by the compressed divided-image synthesizing portion 15 on the basis of the data on the compressed divided-area images stored in the compressed divided-image storage 14.

The motion vector information of FIG. 8 indicates that the last data in the last vertical line (column) in the first horizontal line (row) of the divided-area image #1 shall be connected to the third column in the second row of the divided-area image #6. Referring to FIG. 6C, the part elongating portion 15a matches the address "000080" of the first row of the divided-area image #1 to the last code "2W" in the first row by using the address tables of FIG. 9 and, then, elongates the code "2W" to "11" according to the relation shown in FIG. 7. The part elongating portion 15a further matches the address "014100" of the second row of the divided-area image #6 to the top code "1B" in the second row by using the address tables of FIG. 9 and, then, elongates the code "1B" to "0" according to the relation of FIG. 7. The data (1B) is for one pixel and does not correspond to the third position in the second row. The part elongating portion 15a further elongates code "3W" (next to code "1W" in the second row) to "111" according to the relation of FIG. 7.

The image #1 is partially elongated at the first row to "11" and the image #6 is partially elongated at the second row to "111".

Figure 6D:
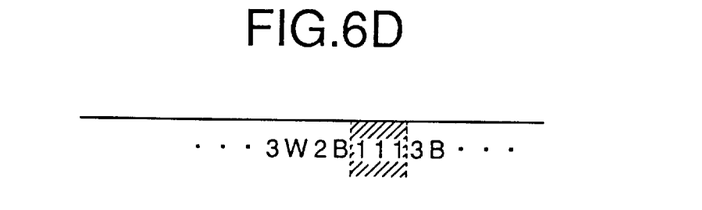

The binding portion 15b joins together both partially elongated images according to the motion vector information of FIG. 8 as shown in FIG. 6D. Namely, "1" in a square of the divided-area image #1 and "1" in a square of the divided-area image #6 are bounded to form a joint "111" of the images #1 and #6.

Figure 6E:
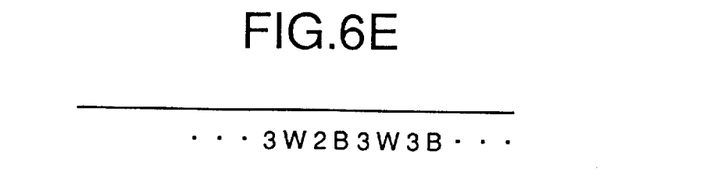

Finally, the part compressing portion 15c compresses the joined part data "111" by using a coding table of FIG. 7. The compressed data is "3W" as shown in FIG. 6E in this example.

Similarly to the above-mentioned example of horizontally binding the divided-area images #1 and #6, the divided-area images #1 and #2 can be joined in the vertical direction by elongating only necessary parts. Similar processing is further conducted for every couple of the divided-area images' #1 to #6 to generate a compressed entire-area image.

As described above, the compressed divided-area image synthesizing portion 15 can synthesize the divided-area images first by partially elongating only necessary parts of each couple of divided-area images by the part elongating portion 15a, next by joining the elongated parts of both divided-area images by the binding portion 15b, and finally by compressing the joined elongated part of the coupled divided-area images by the part compressing portion 15c. This portion achieves considerable saving in the amount of data to be processed for image synthesizing and realizes higher speed still-image synthesizing.

The image thus synthesized and compressed by the compressed divided-area synthesizing portion 15 is stored in the synthesized image storage 16 having a capacity which may be much reduced as compared with conventional devices by virtue of the synthesized image being also compressed.

The synthesized image from the synthesized image storage 16 through the synthesized image output portion 17 is output as compressed if a receiving external device is a memory card or the like. The synthesized image may also be extended to its initial size and then transferred through the synthesized image output portion 17 to an external device that is a printer or a display unit.

Embodiment 2

Figure 10:
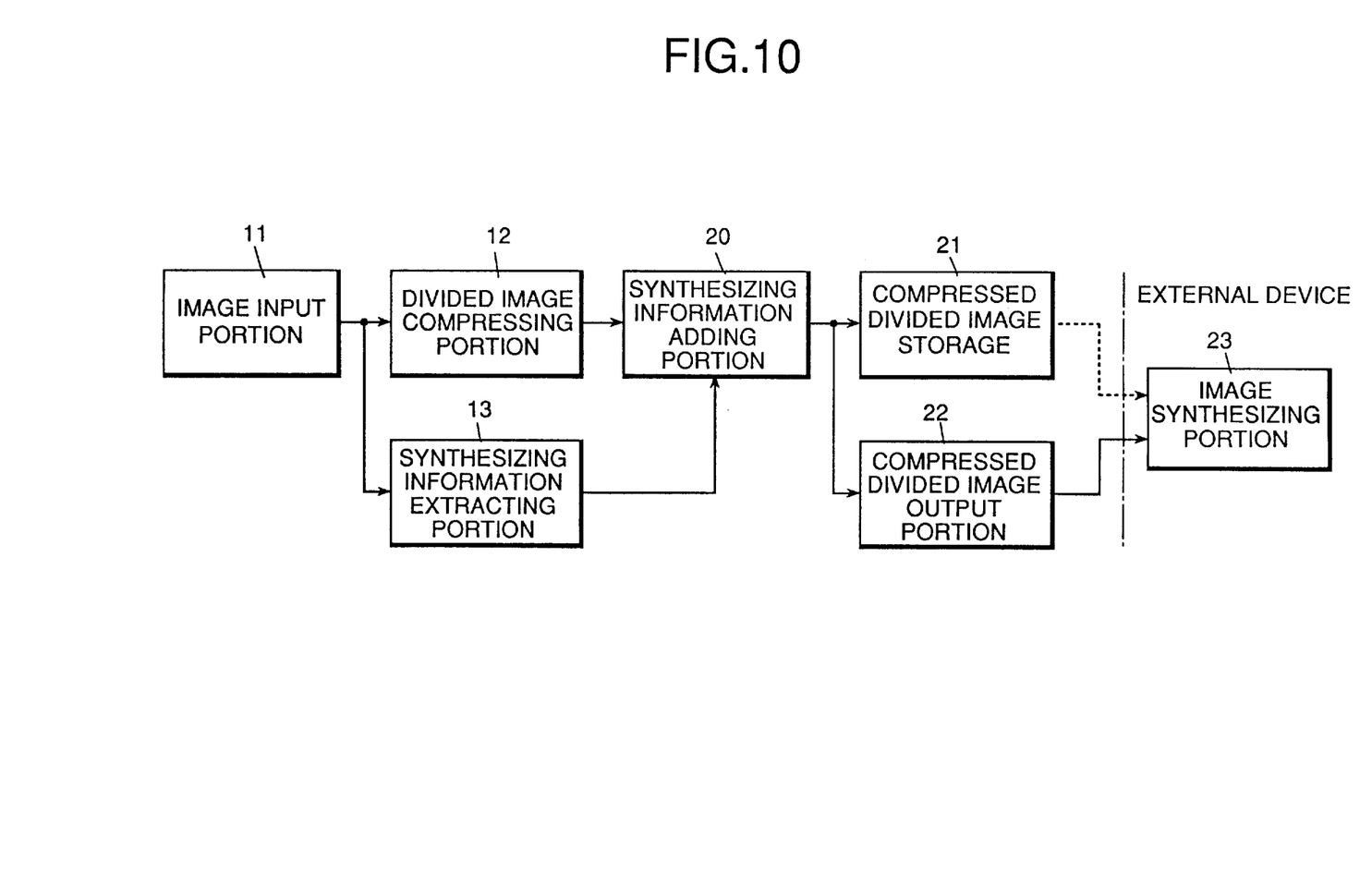
FIG. 10 is a block diagram showing a construction of a second embodiment of a still-image camera according to the present invention.

FIG. 10 is a block diagram showing the structure of the second embodiment of a still-image taking camera according to the present invention. In FIG. 10, portions corresponding to those of FIG. 3 are given the same reference numerals.

FIG. 10, an image input portion 11, a divided-image compressing portion 12 and a synthesizing information extracting portion 13 are similar to those of the first embodiment and therefore will not be described in detail.

This embodiment differs from the first embodiment by excluding therefrom the compressed divided-image synthesizing portion 15 of the first embodiment and by including a synthesizing information adding portion 20 which provides each divided-area image compressed by the divided-image compressing portion 12 with synthesizing information extracted by the synthesizing extracting portion 13.

Figure 11:
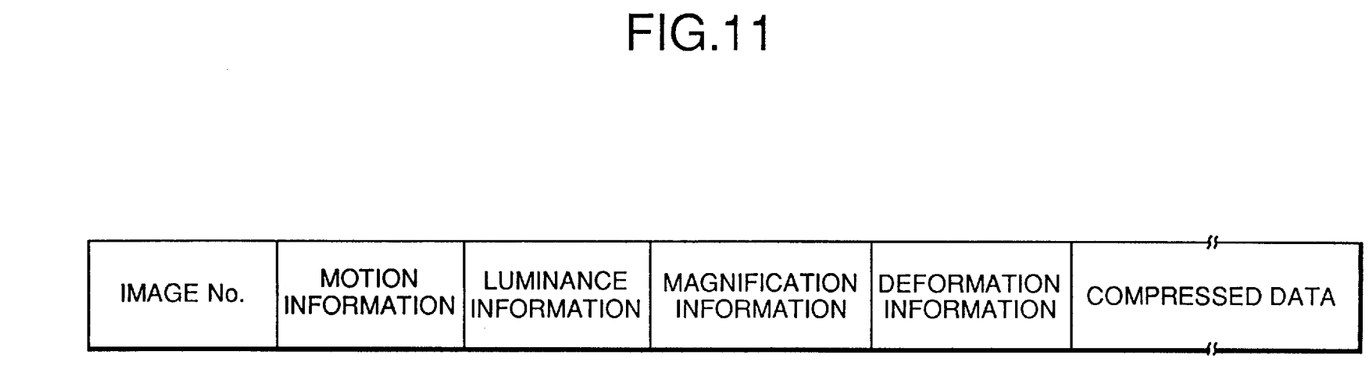
FIG. 11 shows an exemplified data-format in the case of adding synthesizing data to a partial compressed image.

FIG. 11 shows a data-format to be prepared by the synthesizing information adding portion 11, which header includes various kinds of information (e.g., image numbers, motion information), which is necessary for synthesizing the compressed divided-area images in the external devices.

The compressed divided-area images provided with synthesizing information are temporarily stored in a compressed divided-image storage 21 or output directly through a compressed divided-image output portion 22 to an external device such as a printer, display unit, memory card and so on.

An image synthesizing portion 23 included in an external device analyzes the data-format of FIG. 11 and conducts synthesis of the received images in the same procedure as described in the first embodiment of the present invention. The compressed divided-area images may be all extended and synthesized if the external device has a memory of enough capacity.

The compressed divided-area images may be output as compressed to a memory card or the like external device.

In this embodiment, divided-area images taken through the image input portion 11 are compressed by the divided-image compressing portion 12 and can be temporarily stored in the compressed divided-image storage 21 which may be reduced in capacity as compared to the conventional device.

The second embodiment may further reduce the memory capacity than the first embodiment because of excluding therefrom image synthesizing facilities like the compressed divided-area image synthesizing portion 15 and transferring the image synthesizing process to an external device. The embodiment thus simplified in its construction assures further saving in size and weight and reduction of electric energy consumption and of cost to manufacture.

The still-image taking cameras according to the present invention offer the following advantages in comparison with conventional devices.

The first embodiment of the present invention may have a reduced memory capacity since divided-area images obtained by an image input portion are compressed by a divided-image compressing portion and then stored in a compressed divided-image storage.

In successively compressing divided-area images by the divided-image compressing portion, information which is necessary for synthesizing images later is previously extracted therefrom by a synthesizing information extracting portion, thereby the compressed divided-area images can be matched with each other according to the extracted synthesizing information and synthesized by the compressed divided-image synthesizing portion. An entire-area image in compressed state is obtained by the compressed divided-image synthesizing portion and can be stored in a synthesized image storage having a reduced memory capacity.

Particularly in the compressed divided-image synthesizing portion, a part elongating portion elongates only a local part of each compressed divided-area image, which is necessary for synthesizing each compressed divided-area image, a binding portion connects local-part images elongated by the part elongating portion, and a part compressing portion compresses local-part images connected with each other by the binding portion, thereby the amount of data to be processed for image synthesizing is small and required processing time, therefore, is short enough to achieve high-speed image processing and be applicable for real-time image processing devices.

In the second embodiment of the present invention, each divided-area image is compressed by a divided-image compressing portion, synthesizing information is previously extracted from not yet compressed images by a synthesizing information extracting portion and is added to the compressed divided-area image by a synthesizing information adding portion and the compressed divided-area image with the synthesizing information added thereto is output through the output portion to an external device that can synthesize the received images, thereby eliminating the need of performing image synthesizing processing and storing the synthesized image within the camera body. These design features may realize miniaturization of the still-image taking camera with reduced power consumption and reduced cost to manufacture. Furthermore, a plurality of the still-image taking cameras of this type can be effectively used by commonly utilizing an external device having image synthesizing facilities.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A still-image taking camera comprising:

an image input portion for taking a plurality of still-images of divisions of an area of an object;

a divided-image compressing portion for generating compressed divided-area images by compressing the divided-images taken and input by the image input portion;

a synthesizing information extracting portion for extracting synthesizing information necessary for image synthesizing from the divided-area images taken and input by the image input portion and not yet compressed by the divided-image compressing portion;

a compressed divided-image storage for storing therein compressed divided-area images obtained by the divided-image compressing portion; and a compressed divided-image synthesizing portion for generating a compressed entire-area image by synthesizing the compressed divided-area images stored in the compressed divided-image storage on the basis of the synthesizing information extracted by the synthesizing information extracting portion.

2. The still-image taking camera as defined in claim 1, wherein the compressed divided-image synthesizing portion comprises:

a part elongating portion for elongating only a local part of each stored compressed divided-area image, the local part being necessary for synthesizing each stored compressed divided-area image;

a binding portion for connecting local-part images elongated by the part elongating portion; and a part compressing portion for compressing local-part images connected with each other by the binding portion.

3. A still-image taking camera comprising:

an image input portion for taking a plurality of still-images of divisions of an area of an object;

a divided-image compressing portion for generating compressed divided-area images by compressing the divided-images taken and input by the image input portion;

a synthesizing information extracting portion for extracting synthesizing information necessary for image synthesizing from the divided-area images taken and input by the image input portion and not yet compressed by the divided-image compressing portion;

a synthesizing information adding portion for adding the synthesizing information extracted by the synthesizing information extracting portion to each compressed divided-area image generated by the divided-image compressing portion; and a compressed divided-image output portion for outputting each compressed divided-area image having synthesizing information attached thereto by the synthesizing information adding portion.

4. A camera comprising:

imaging means for imaging an object and providing a plurality of divided image portions of the object;

extraction means for extracting synthesizing information from the divided image portions;

compression means for compressing the divided image portions;

storage means for storing the compressed divided image portions; and synthesis means for generating a synthesized compressed entire image of the object by synthesizing the stored compressed divided image portions based on the extracted synthesizing information.

5. The camera of claim 4, wherein said synthesis means decompresses predetermined parts of the stored compressed divided image portions, combines the decompressed predetermined parts and compresses the combined parts to provide the synthesized compressed entire image.

6. The camera of claim 5, wherein said synthesis means aligns the decompressed predetermined parts based on the extracted synthesizing information prior to combining the decompressed predetermined parts.

7. The camera of claim 4, wherein the extracted synthesizing information comprises motion vectors derived from adjacent ones of the plurality of divided image portions.

8. A method of image synthesis comprising the steps of:

a) imaging an object and providing a plurality of divided image portions of the object;

b) extracting synthesizing information from the divided image portions;

c) compressing the divided image portions;

d) storing the compressed divided image portions; and e) generating a synthesized compressed entire image of the object by synthesizing the stored compressed divided image portions based on the extracted synthesizing information.

9. The method of image synthesis of claim 8, wherein said step e) comprises:

e1) decompressing predetermined parts of the stored compressed divided image portions;

e2) combining the decompressed predetermined parts; and e3) compressing the combined parts to provide the synthesized compressed entire image.

10. The method of image synthesis of claim 9, wherein said step e2) comprises aligning the decompressed predetermined parts based on the extracted synthesizing information prior to combining the decompressed predetermined parts.

11. The method of image synthesis of claim 8, wherein said step b) comprises extracting motion vectors derived from adjacent ones of the plurality of divided image portions.

12. A camera comprising:

imaging means for imaging an object and providing a plurality of divided image portions of the object;

extraction means for extracting synthesizing information from the divided image portions;

compression means for compressing the divided image portions;

appending means for adding the extracted synthesizing information to each of the plurality of divided image portions; and output means for outputting each of the plurality of divided image portions having synthesizing information added thereto.

* * * * *